Patented Mar. 11, 1941

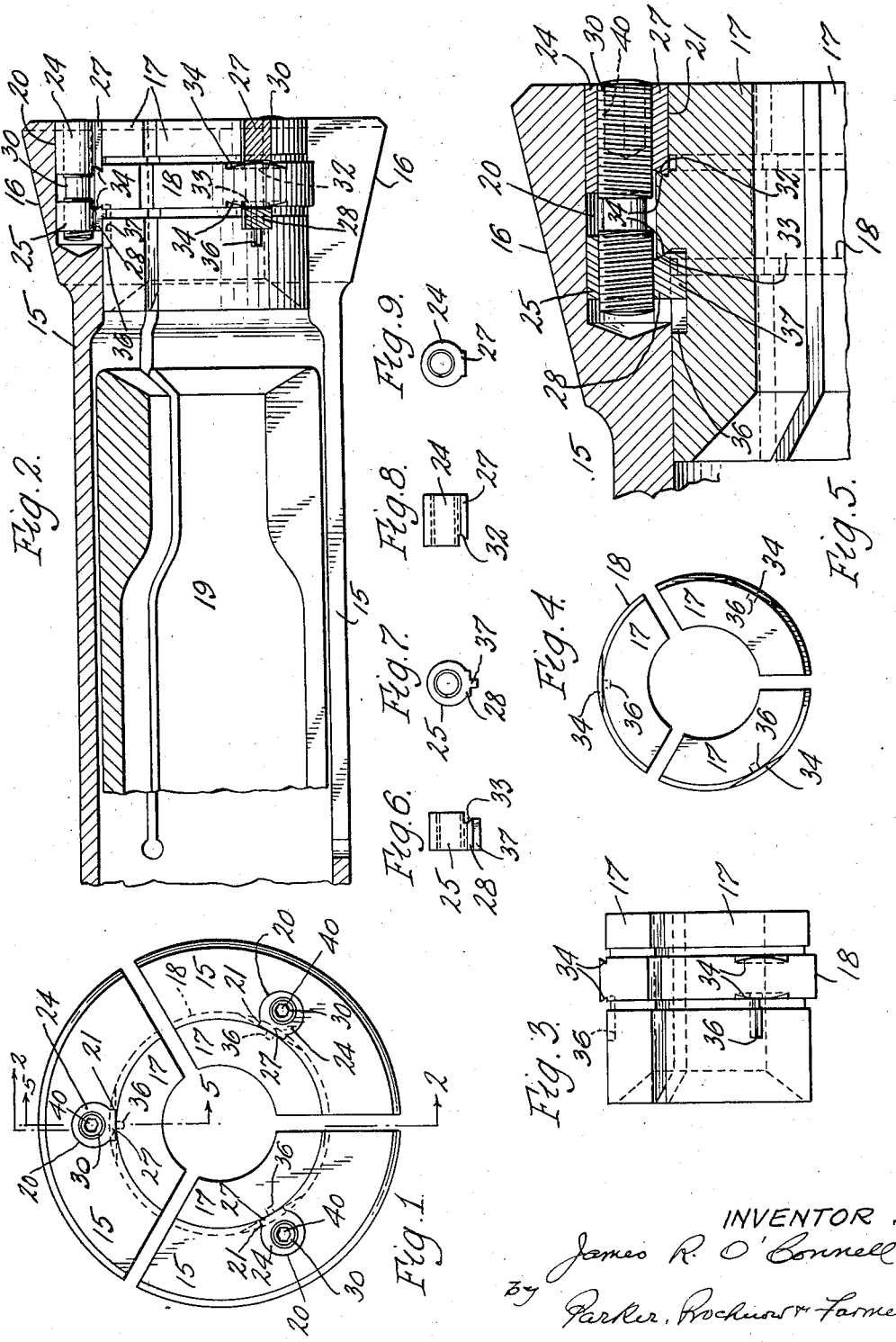

2,234,603

UNITED STATES PATENT OFFICE 2,234,603

COLLET OR CHUCK

James R. O'Connell, Elmira, N. Y., assignor to Hardinge Brothers, Inc., Elmira, N. Y.

Application April 13, 1939, Serial No. 267,670

12 Claims. (Cl. 279—46)

This invention relates to improvements in chucks or collets of the kind which are used for holding or gripping the work in metal working machines, such for example as automatic screw machines, and more particularly to chucks or collets of this kind having replaceable work engaging pads or jaws.

Chucks or collets equipped with removable pads have heretofore generally been provided with screws or other means for holding the removable pads in place on the spring fingers of the collet, and these screws generally extended through substantially radial holes in these fingers. In most machines screws are not accessible without dismantling a part of the machine to permit the collet to be removed. The removal of these collets from the machines requires considerable time and during this time, the machine is, of course, idle.

One of the objects of this invention is to provide a collet or chuck having pads removably secured to the spring fingers thereof, with means for holding such pads in their operative positions, such holding means being operable from the end face of the collet, so that the pads may be quickly removed and replaced by other pads without dismantling a portion of the machine on which the collet is mounted. Another object of this invention is to provide a chuck or collet with gripping devices operable from the end face of the collet, and which serve to grip portions of the pads to hold them against movement relatively to the collet. A further object is to provide a spring finger of a collet of this kind with a pad holding device operable from the end face of the collet, and which includes a pair of members movable in opposite directions into gripping engagement with a part of a pad. Another object is to provide pads for collets with extensions or projections which are formed to be gripped by holding means arranged in the spring fingers of a collet and operable from the end face thereof.

Still another object of this invention is to provide a collet having, in the end portions of its spring fingers, recesses extending substantially parallel with the axis of the collet and terminating at the outer face of the collet, and providing in the recesses, gripping members movable into and out of engagement with portions of the pads.

A further object of this invention is to provide a collet spring finger with a gripping device for a removable pad, in which the gripping device comprises a pair of gripping members movable in opposite directions into and out of engagement with the pad by means of a screw having right-hand and left-hand threaded portions which engage correspondingly threaded parts of the gripping members.

Other objects of this invention will appear from the following description and claims.

In the accompanying drawing:

Fig. 1 is a face view of the outer end of a chuck or collet embodying this invention.

Fig. 2 is a fragmentary longitudinal sectional view thereof, on line 2—2, Fig. 1.

Fig. 3 is a view showing the pads or work engaging jaws of a collet removed therefrom.

Fig. 4 is an end view of the pads shown in Fig. 3.

Fig. 5 is a fragmentary longitudinal sectional elevation approximately on line 5—5, Fig. 1, and on an enlarged scale.

Figs. 6 and 7 are respectively side and end views of one of the gripping members of my improved pad holding means.

Figs. 8 and 9 are respectively side and end views of the other gripping member thereof.

In Figs. 1 and 2, I have illustrated by way of example an embodiment of my invention showing the same applied to a collet of an automatic screw machine, the collet being in the main of tubular or substantially cylindrical form and having slots extending lengthwise from one end thereof to form spring fingers 15, three such fingers being shown in the construction illustrated. The fingers are so formed that the spring tension thereof tends to urge the outer portions thereof outwardly away from the longitudinal axis of the collet and the fingers are provided near their outer portions with enlarged ends having inclined or substantially frusto-conical outer faces 16, which are formed to cooperate with corresponding faces of a part of a screw machine in such a manner that by relative movement in an axial direction, a sliding wedge action takes place which tends to move the ends of the spring fingers 15 toward each other, and thus cause them to securely grip the work while cutting or other operations are performed on the same. The spring fingers 15 of the collet are provided at their inner faces near their outer portions with suitable pads or work gripping jaws 17, one being employed for each spring finger of the collet.

These pads or work gripping jaws are also provided with any suitable or usual means which cooperate with the spring fingers to hold the pads against lengthwise movement relatively to the collet. In the construction illustrated, the group of pads employed with the collet is provided with a substantially cylindrical outer surface having an outwardly projecting annular rib or shouldered portion 18 which is adapted to fit into a corresponding annular groove formed on the inner faces of the spring fingers 15, so that by means of the engagement of the rib or annular projection 18 in the groove of the collet, the pads are positively held against endwise movement relatively to the collet.

19 represents the usual feed chuck having a plurality of fingers urged by spring tension into engagement with the bar or work and arranged to reciprocate within the collet in such a manner that when the ends of the collet are separated to release the work, the feed chuck 19 will feed the work forward between the feed fingers to the desired extent, whereupon the fingers of the collet are moved into gripping engagement with the work through the medium of the beveled faces 16, and the machining of the portion of the work extending beyond the collet is then started. While I have illustrated a collet provided with three spring fingers and three work engaging jaws or pads, it will be obvious that the collet may have more than three spring fingers.

It has generally been customary heretofore to secure the jaws or pads 17 in their operative positions in engagement with the inner faces of the enlarged ends of the collet by means of screws extending approximately radially with reference to the axis of the collet and arranged in holes extending through the beveled or frusto-conical faces 16 of the spring fingers. These screws were, consequently, not accessible except by removal of the collet from the machine, and this necessitated the taking apart of a considerable portion of the work feeding part of the machine. In the construction herein shown, this difficulty is avoided by providing gripping means for the jaws or pads which are operable from the exposed outer end face of the collet so that the jaws or pads may be removed from the collet and replaced by others in a comparatively short interval of time. This is accomplished, in the particular construction illustrated, by providing each of the spring fingers of the collet with an aperture or recess 20 which may conveniently be made of cylindrical form to extend inwardly from the outer end face of the collet, substantially parallel to the axis of the collet. These cylindrical recesses or holes may readily be produced by drilling inwardly from the outer face of the collet and a portion of the metal between each hole or cylindrical recess and the inner face of the spring finger 15 is then removed to form a connecting passage 21 between the cavity or recess 20 and the inner face of the spring finger.

In accordance with my invention, I provide in each of the recesses or cavities 20, means which cooperate with portions of the pads or work gripping jaws, for the purpose of holding these jaws in correct relation to the ends of the spring fingers 15. Any suitable means may be provided for this purpose, and in the construction shown, I have provided in each cavity or recess 20 a pair of slidable pad gripping members 24 and 25. Both of these gripping members have a substantially cylindrical outer contour adapted to fit slidably within the cylindrical recesses or holes 20, and these gripping members also have parts extending into the connecting passage or slot 21 to hold these members against turning. The member 24 is for this purpose provided with a projection 27 which extends radially through the slot or passage 21, and a corresponding projection 28 is formed on the other slidable gripping member 25.

Any suitable or desired means may be provided for moving the clamping members 24 and 25 in their holes or recesses 20. In the particular construction illustrated by way of example, both of these slidable gripping members 24 and 25 are provided with threaded holes extending lengthwise thereof adapted to engage with threaded portions of an adjusting screw 30. This screw has right-handed and left-handed threaded portions, one of which engages with the member 24, and the other of which engages with the member 25. Consequently, upon turning of the adjusting screw 30, the slidable members 24 and 25 will be moved in opposite directions, either toward or from each other, depending upon the direction of rotation of the screw. The turning of the screw can easily be done without dismantling any portion of the machine in which the collet is used, since the end of each screw is readily accessible from the outer exposed end of the collet.

The slidable members 24 and 25 are provided with suitable means for gripping a pad or work engaging jaw, and in the particular construction shown for this purpose, the ends of the portions 27 and 28 of these two members are provided with inclined or beveled undercut ends 32 and 33, adapted to cooperate with corresponding parts on a pad, which may, for example, be conveniently formed on the projecting rib 18 of the pad. In the particular construction shown, each of the pads or jaws 17 is provided with undercut faces 34 formed on portions of the edges or shoulders of the rib 18, see Figs. 3 and 4. These faces are preferably approximately in the middle portions of the pads or jaws. Consequently, it will be obvious by reference to Figs. 2 and 5 that when the two members 24 and 25 move toward each other by turning the screw 30, the inclined or beveled portions 32 and 33 of the members 24 and 25 will engage with the undercut or beveled surfaces or portions 34 of the pads or jaws, and thus hold the pads in correct relations to the spring fingers 15. Other means may, of course, be provided in the cavities or recesses 20 for gripping the pads, and while I have shown only one pad gripping device for each spring finger, it will be obvious that two or more cavities and pad gripping devices may be employed on each spring finger.

In order to facilitate the positioning of the pads in correct relation to the gripping members, I prefer to provide some means for centering each pad laterally of its spring finger, the rib 18, of course, serving to position the pad correctly lengthwise of the finger. In the particular construction illustrated for this purpose, I have provided each pad or work gripping jaw with a slot or recess 36 extending lengthwise on the outer surface of each pad. I have also provided the extension 28 of the movable gripping member 25 with a key or projection 37, see particularly Fig. 7. This key or projection is formed to enter into the slot 36 and to move lengthwise therein. Consequently, when the pad is positioned on a spring finger, assuming that the gripping members 24 and 25 are moved apart from the positions shown in Figs. 2 and 5, a pad may very readily be correctly located with reference to a spring finger by inserting the rib 18 on the outer face of the pad into the corresponding groove of a spring finger of the collet and also causing the projection or key 37 to enter into the longitudinal groove or keyway 36. When the pad is thus positioned, by turning the screw 30, the pad gripping members 24 and 25 can be moved toward each other into engagement with the undercut beveled faces 34 of the pad, whereupon the pad is securely held in place. The pad, of course, may be released by merely turning the screw 30 in the opposite direction of rotation.

The pad holding means described are very efficient and reliable and are so designed that the strains to which the pads are subjected are not carried by the relatively small pad gripping means, nor by the threads of the adjusting screws, since it will be noted that the screws do not engage the pads nor the spring fingers. The pressure of the pads against the work is, of course, borne by the outer faces of the pads engaging the inner faces of the spring fingers and these strains are, consequently, not transmitted to the pad holding means. Endwise forces exerted on the pads 17 by the work are resisted by the engagement of the annularly extending bands 18 within the corresponding recesses in the inner face of the collet, and consequently, these strains will not be transmitted to the gripping members 24 and 25.

The screws 30 are preferably provided on their outer ends with recesses or sockets 40, Fig. 1, which may be of hexagonal or other cross section and into which a corresponding part of a wrench or similar implement may be inserted or other means for actuating the gripping members 24 and 25 from the outer face of the collet may be provided. The pads can, consequently, be easily and quickly removed and replaced by others without removing the collet or work gripping jaw from the machine in which it is installed and without dismantling any part of the machine. My construction also has the advantage that the pad gripping members 24 and 25, together with the screw 30, can easily be removed from their cavity or recess 20, in which they are confined by the pads only when in gripping engagement therewith. By this arrangement the necessity of any means for mounting the gripping members in their cavities independently of the pads is eliminated. My construction also enables the gripping members to locate themselves correctly lengthwise of the cavity when moving into clamping positions. Furthermore, the clamping members can readily be removed from their cavities for inspection, repair, or replacement.

I claim as my invention:

1. A chuck having a plurality of spring fingers, a work engaging pad removably secured to the outer portion of each finger, each finger having a cavity formed therein extending lengthwise of said finger and terminating in the outer end of the finger, a pair of gripping members in said cavity having parts adapted to engage a pad for holding the same in operative relation to its finger, and means operable through said end of said cavity for moving said gripping members into and out of engagement with a pad.

2. A chuck having a plurality of spring fingers, a work engaging pad removably secured to the outer portion of each finger, each finger having a cavity formed therein extending lengthwise of said finger and terminating in the outer end of the finger, a pair of gripping members in said cavity having parts adapted to engage a pad for holding the same in operative relation to its finger, and a screw extending into said cavity and engaging said gripping members for moving the same into and out of engagement with said pad.

3. A chuck having a plurality of spring fingers, a work engaging pad removably secured to the outer portion of each finger, each finger having a longitudinally extending cavity formed therein terminating in the outer end of the finger, a pair of pad engaging members slidably arranged in said cavity and having oppositely disposed undercut parts adapted to engage corresponding undercut parts of said pads, and means operable from the open end of said cavity for moving said members relatively to each other into and out of holding engagement with said pad.

4. A chuck having a plurality of spring fingers, a work engaging pad removably secured to the outer portion of each finger, cooperating parts on a finger and pad for holding said pad against movement lengthwise of said chuck when said pad is in operative position, said finger having a cavity formed therein extending lengthwise of said finger and terminating at the outer face of said finger, a pair of pad engaging members slidably arranged in said cavity and having gripping portions adapted to engage corresponding portions of said pad for holding said pad in operative relation to said finger, and means operable through the open end of said cavity for moving said pad engaging members relatively to each other into and out of holding engagement with said pad.

5. A chuck having a spring finger provided with a cavity therein extending lengthwise of said finger from the outer end thereof, a pad adapted to be secured to the end of said finger, an outwardly extending rib on said pad arranged to enter into a groove in said finger to hold said pad against movement lengthwise of said finger when said pad is in operative relation to said finger, the opposite edges of said rib being undercut, a pair of gripping members slidably arranged in said cavity and having undercut parts adapted to cooperate with the undercut portions of said rib, and means for moving said parts in said cavity into gripping relation to the undercut parts of said rib.

6. A chuck having a spring finger provided in the end portion thereof with a substantially cilindrical cavity terminating in the outer end of said finger, said cavity including a channel extending lengthwise of said cavity and connecting the cylindrical portion of said cavity with the inner face of said finger and having a width less than the diameter of said cavity, a gripping member slidably arranged in said cylindrical cavity and having a portion extending into said channel to hold said member against turning in said cavity, a pad adapted to be secured to the inner face of said finger, and cooperating means on said gripping member and said pad for holding said pad in operative relation to said finger.

7. A chuck having a spring finger provided in the end portion thereof with a substantially cylindrical cavity terminating in the outer end of said finger, a gripping member slidably arranged in said cavity and movable lengthwise of said cavity into and out of the open end thereof, means for holding said gripping member against rotation in said cavity, means in said cavity and associated with said gripping member for moving said gripping member lengthwise in said cavity, a pad adapted to be secured to said finger, and cooperating means on said gripping member and said pad for holding said pad in operative relation to said finger upon lengthwise movement of said gripping member in said cavity.

8. A chuck having a spring finger provided in the end portion thereof with a longitudinally extending cavity terminating in the outer end of said finger and in communication with the interior of said chuck, a pad adapted to be secured to the inner face of said spring finger, a gripping member slidably arranged in said cavity, cooperating parts on said pad and said gripping member for locking said pad on said spring finger, interfitting portions on said pad and said gripping member for facilitating the positioning of said pad in correct relation to said finger and gripping member and for holding said pad against movement relatively to said finger in a direction about the axis of said chuck, and means operable from the outer end of said finger for moving said gripping member lengthwise of said cavity into and out of gripping engagement with said pad.

9. A chuck having a spring finger provided on its inner face with a groove extending transversely of the length of the finger and having a longitudinally extending cavity terminating at the outer end of said finger and intersecting said groove, a pad adapted to be secured to the inner face of said spring finger and having an outwardly extending rib formed to enter said groove, a pair of gripping members slidably arranged in said cavity and having parts arranged to interlock with opposite sides of said rib, and means operable from said outer end of said cavity for moving said gripping members toward the opposite sides of said rib.

10. A chuck having a plurality of spring fingers, a work engaging pad removably secured to the outer portion of each finger, each finger having a cavity formed therein terminating in the outer end of the finger, a pad engaging member movably arranged in said cavity and having an undercut part adapted to engage a corresponding part on said pad, a screw arranged in said cavity and engaging said pad engaging member and operable from the open end of said cavity, and means with which said screw reacts for moving said pad engaging member into and out of gripping engagement with said pad.

11. In a chuck having a plurality of spring fingers and a work engaging pad removably secured to the outer portion of each finger, that improvement which includes providing each finger with a cavity extending lengthwise of the finger and terminating at one end in the outer end of the finger, a pair of gripping members in said cavity having parts adapted to engage a pad for holding the same in operative relation to its finger, said gripping members being positively movable in said cavity in opposite directions into gripping engagement with said pad, and a screw having a portion thereof provided with a right-hand thread and engaging one of said gripping members and another portion thereof provided with a left-hand thread engaging the other gripping member, for simultaneously moving said gripping members into and out of gripping engagement with said pad.

12. In a chuck having a plurality of spring fingers and a work engaging pad removably secured to the outer portion of each finger, that improvement which includes providing each finger with a cavity extending lengthwise of the finger and terminating at one end in the outer end of the finger, a side of the cavity extending through that face of the finger which is adjacent to the pad, a pair of gripping members in said cavity having parts extending through said side of the cavity to engage a pad for holding the same in operative relation to its finger, said gripping members having threaded apertures extending lengthwise therethrough, one of said apertures having a right-hand thread and the other aperture having a left-hand thread, and a screw having a right-hand threaded portion engaging with the correspondingly threaded aperture of one of said gripping members and a left-hand threaded portion engaging the other gripping member, whereby upon turning said screw, said gripping members are simultaneously moved toward or from said pad.

JAMES R. O'CONNELL.